(12) United States Patent
van den Goor et al.

(10) Patent No.: US 7,588,140 B2
(45) Date of Patent: Sep. 15, 2009

(54) PRODUCT CONVEYOR WITH LOAD-CARRYING PLATFORMS

(75) Inventors: Jacobus Marie van den Goor, Nuenen (NL); Hermannus Josephus Arnoldus Bodewes, Uden (NL)

(73) Assignee: Vanderlande Industries Nederland B.V., Veghel (NL)

( * ) Notice: Subject to any disclaimer, the term of this patent is extended or adjusted under 35 U.S.C. 154(b) by 350 days.

(21) Appl. No.: 10/567,440

(22) PCT Filed: Aug. 3, 2004

(86) PCT No.: PCT/NL2004/000548

§ 371 (c)(1),
(2), (4) Date: Dec. 1, 2006

(87) PCT Pub. No.: WO2005/019069

PCT Pub. Date: Mar. 3, 2005

(65) Prior Publication Data

US 2008/0223697 A1    Sep. 18, 2008

(30) Foreign Application Priority Data

Aug. 7, 2003 (NL) .................................. 1024060
Sep. 11, 2003 (NL) .................................. 1024269
Oct. 9, 2003 (NL) .................................. 1024501

(51) Int. Cl.
*B65G 21/06* (2006.01)
(52) U.S. Cl. .................................. 198/831; 198/833
(58) Field of Classification Search .............. 198/831, 198/833, 851, 853
See application file for complete search history.

(56) References Cited

U.S. PATENT DOCUMENTS

| 3,211,279 | A | * | 10/1965 | Smith | 198/833 |
|---|---|---|---|---|---|
| 3,379,300 | A | * | 4/1968 | Karr | 198/833 |
| 3,554,360 | A | * | 1/1971 | Bildsoe | 198/833 |
| 3,877,567 | A | * | 4/1975 | Sommerfield | 198/833 |
| 3,893,564 | A | * | 7/1975 | Raynor et al. | 198/833 |
| 5,042,648 | A | | 8/1991 | Garvey | |
| 5,394,978 | A | * | 3/1995 | Majewski et al. | 198/831 |
| 6,186,314 | B1 | | 2/2001 | Conklin, Jr. | |

FOREIGN PATENT DOCUMENTS

| EP | 0 629 566 | 12/1994 |
|---|---|---|
| EP | 0 753 474 | 1/1997 |
| EP | 0 782 966 | 7/1997 |

(Continued)

*Primary Examiner*—James R Bidwell
(74) *Attorney, Agent, or Firm*—Oblon, Spivak, McClelland, Maier & Neustadt, L.L.P.

(57) ABSTRACT

A device for conveying products along an endless conveying path, which device includes a frame, an elongated flexible conveying element supported by the frame, which includes links that are pivotable relative to each other about vertical pivots, load-carrying platforms each having a supporting surface at the upper side, which supporting surfaces jointly form a substantially closed, common supporting surface for the products, which load-carrying platforms are connected to the conveying element via supports and whose supporting surfaces adjoin each other at curved forward and rearward edges thereof, and a drive for driving the conveying element. The drive includes a driving element and the conveying element includes an element driven by the driving element. The driven element forms part of the links of the conveying element.

21 Claims, 12 Drawing Sheets

FOREIGN PATENT DOCUMENTS

| | | |
|---|---|---|
| FR | 749 281 | 7/1933 |
| FR | 1 368 646 | 7/1964 |
| FR | 1 430 240 | 5/1966 |
| FR | 2 583 024 | 12/1986 |
| NL | 9 800 010 | 2/1999 |
| SU | 846 423 | 7/1981 |

* cited by examiner

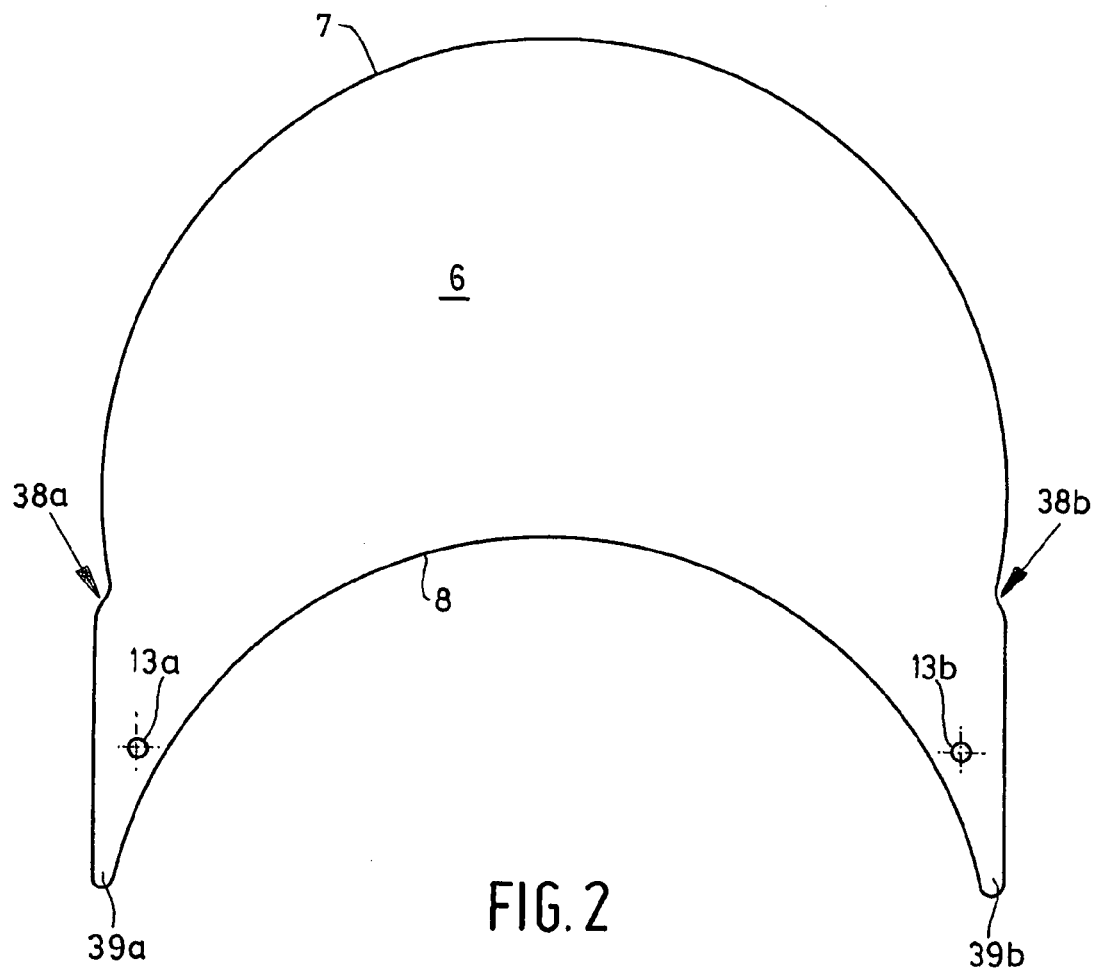
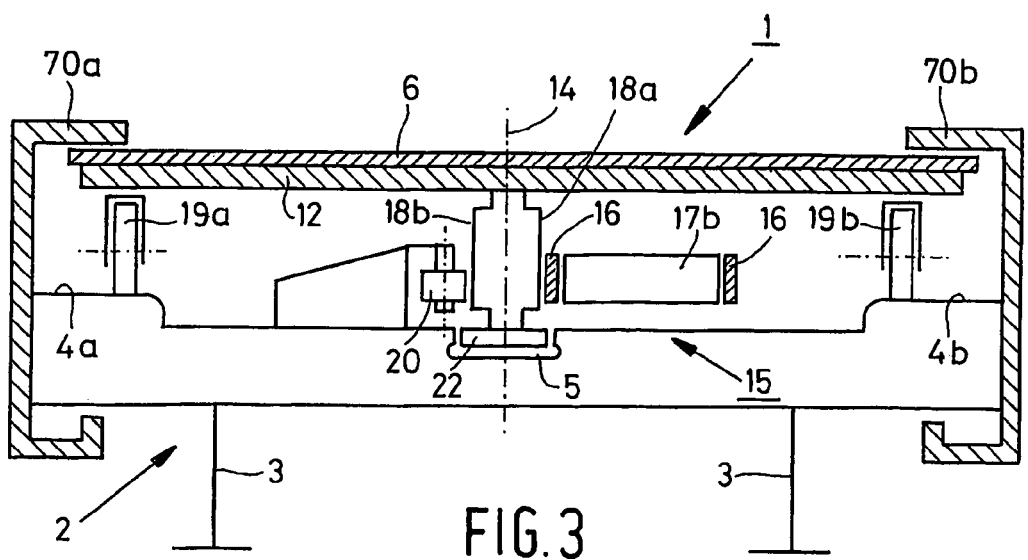

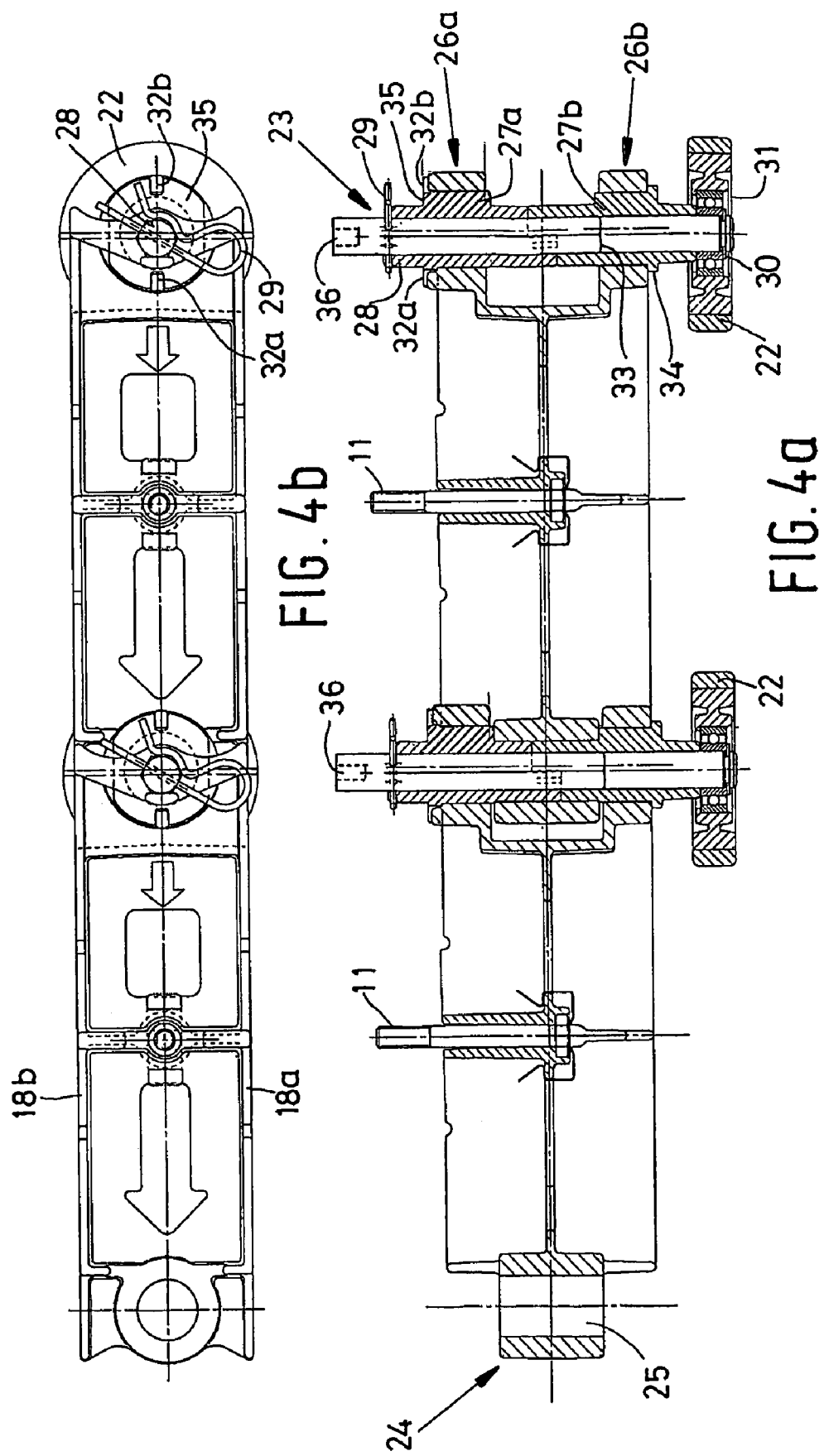

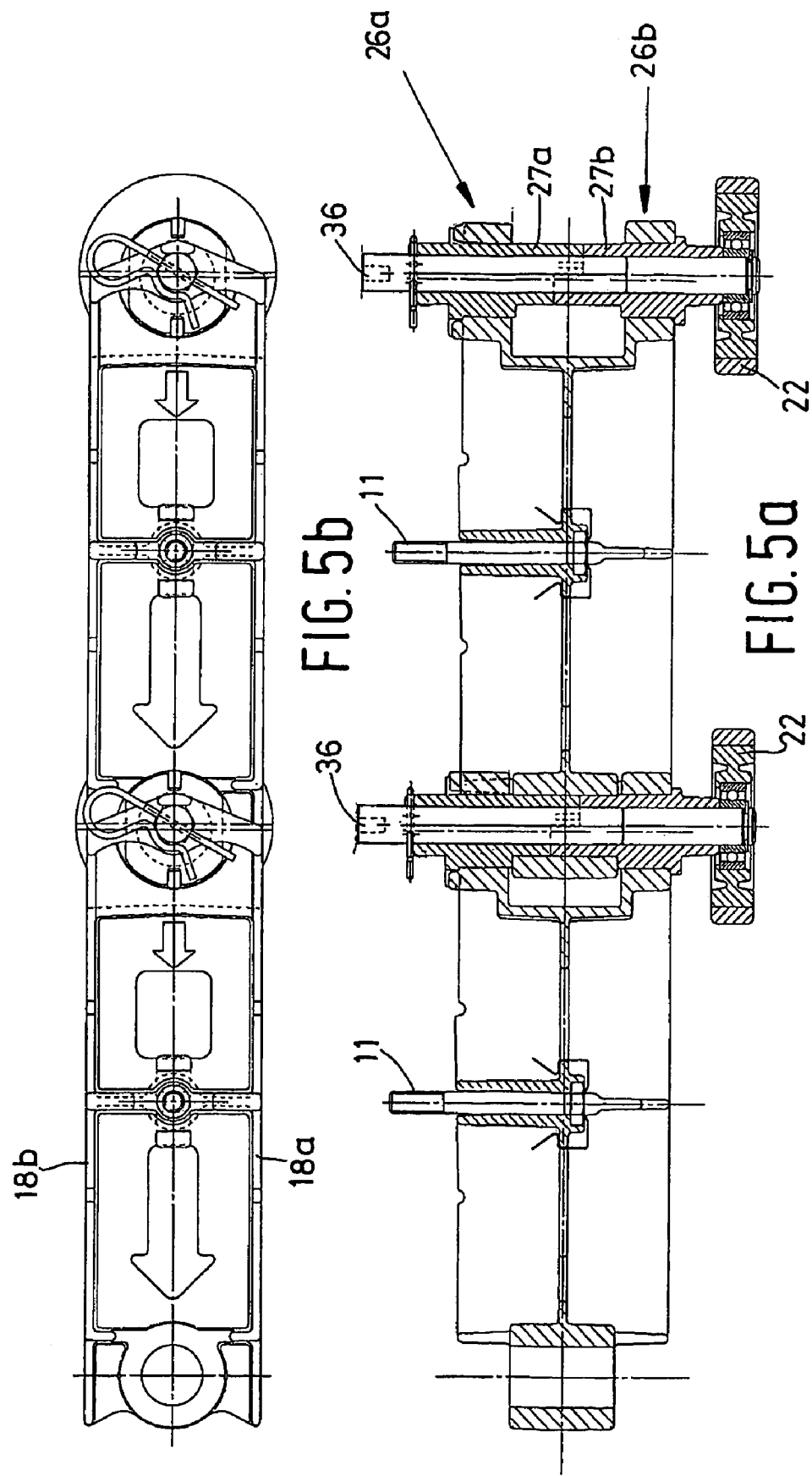

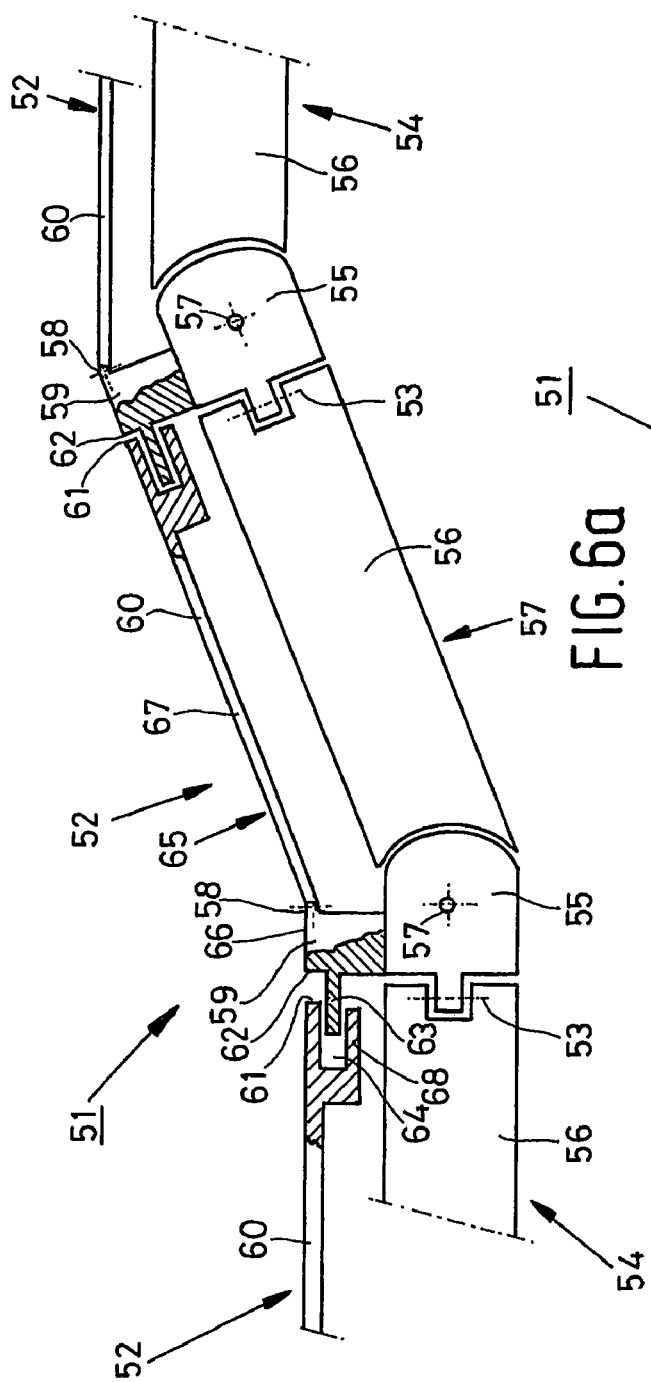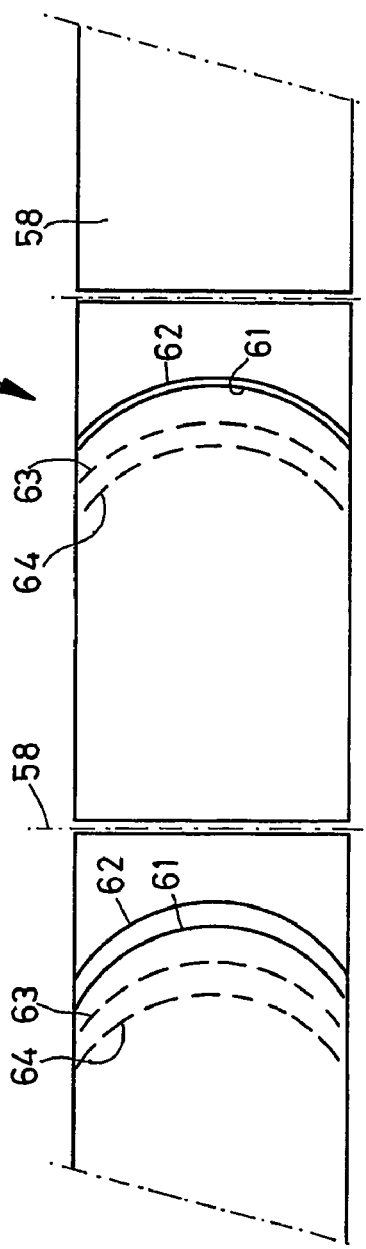
FIG.6a
FIG.6b

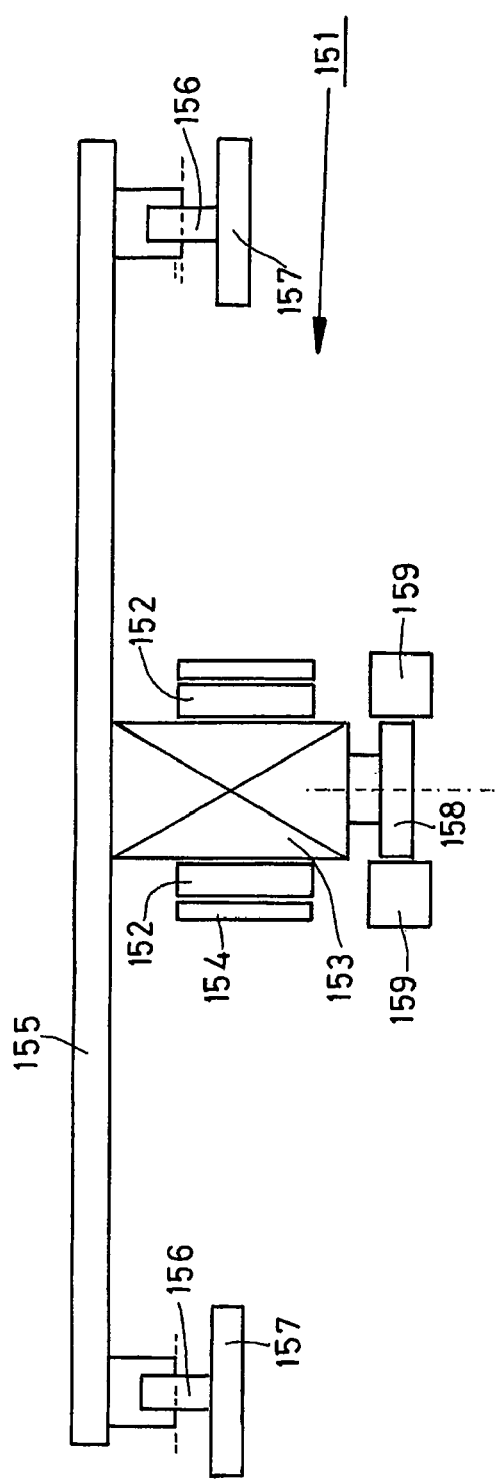
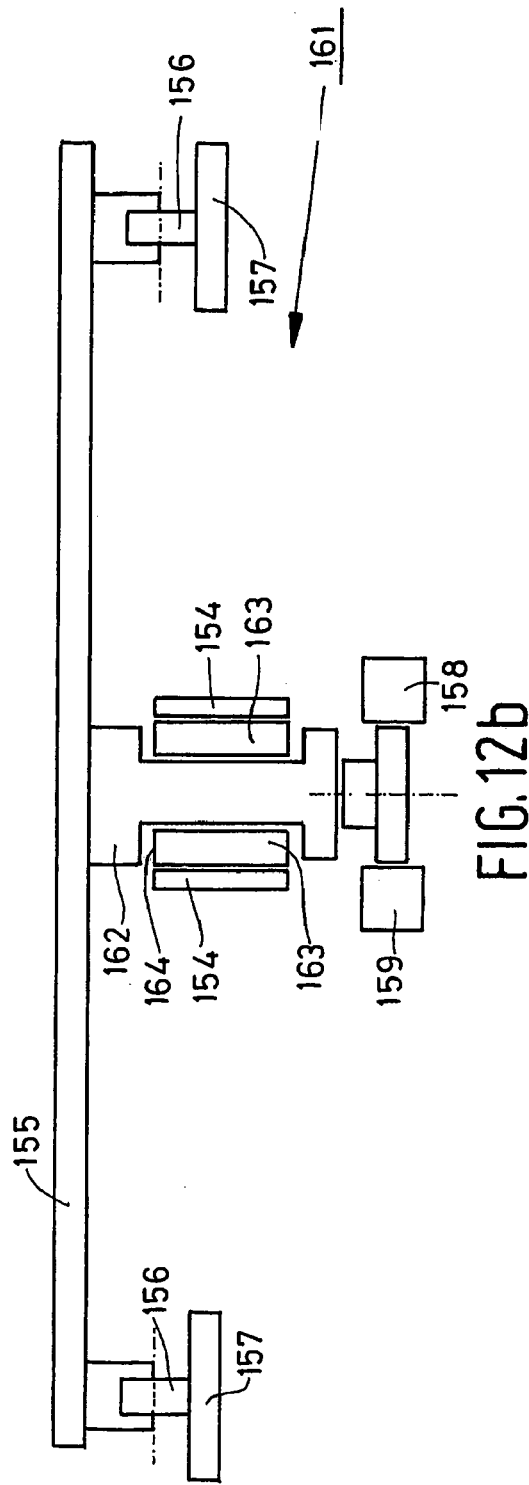
FIG.12a
FIG.12b

PRODUCT CONVEYOR WITH LOAD-CARRYING PLATFORMS

The invention relates to a device for conveying products, in particular pieces of luggage, along an endless conveying path, which device comprises a frame, an elongated flexible conveying element supported by the frame, which comprises links that are pivotable relative to each other about vertical pivots, load-carrying platforms each having a supporting surface at the upper side, which supporting surfaces jointly form a substantially closed, common supporting surface for the products, which load-carrying platforms are connected to the conveying element via supports and whose supporting surfaces adjoin each other at curved forward and rearward edges thereof, as well as drive means for driving the conveying element, said drive means comprising a driving element and said conveying element comprising an element driven by said driving element.

Such a device is described in U.S. Pat. No. 3,554,360. As a result of the curved shape of the forward edges and the rearward edges of the load-carrying platforms described therein, the load-carrying platforms form a substantially closed supporting surface not only during movement of the conveying element moves along a rectilinear part of the conveying path, but also during movement of the conveying element along a curvilinear, horizontal part of said conveying path, whilst it is not necessary to have the load-carrying platforms overlap or to construct the load-carrying platform of a number of parts that are movable with respect to each other, as is the case in European patent application No. EP 753 474 A1, for example, which describes a sorting device comprising compound load-carrying platforms, which are capable of individual, lateral tilting movement. With regard to EP 753 474 A1 it is noted that the conveying elements described therein have been used in practice by Vanderlande Industries in luggage carrousel systems comprising overlapping rubber flaps, which systems are designated by the trade name Triplanar®.

In the conveyor according to U.S. Pat. No. 3,554,360, separate, vertically downwardly extending, more or less fin-shaped friction elements are provided under the links, which are configured as frame members, which friction elements are fixedly connected to the frame members by means of a mounting flange and a clamping plate. The frame members can pivot relative to each other about vertically extending pivot pins. A friction belt is in frictional contact with the friction elements at one longitudinal side thereof, whilst pressure rollers are provided on the opposite longitudinal side for exerting a pressure force in lateral direction on the friction elements with a view to increasing the force of the frictional contact. This construction has a number of drawbacks. In the first place, these drawbacks concern the construction as such, which is complex because of the use of the friction elements, which on the one hand has a cost-increasing effect whilst on the other hand the friction element and the means for mounting the friction elements to the links require additional space. In addition to that, the friction transmission that is used results in a disadvantageous pattern of forces between the friction elements and the associated links on the one hand and between the respective links themselves on the other hand as a result of the fact that substantial bending moments are introduced. These disadvantageous bending moments make it necessary to carry out frequent inspections and maintenance and lead to premature failure of the conveyor, for example due to fracture of the rigid connection between the friction element and an associated link. This is an absolutely real risk if the friction elements are made of a flexible material, such as a hard rubber or a rubber impregnated laminated material, as is explicitly suggested in U.S. Pat. No. 3,554,360. Such a material will exhibit cracks relatively quickly, especially when loaded by a bending moment perpendicular to the plane of the friction element. In addition to that, said disadvantageous bending moments cause the pivot pins to be moved out of alignment. In spite of the fact that the pivot pins are lubricated, as is required in connection therewith, it will be impossible to prevent wear on the pivot pins and on the frame members that are interconnected by said pivot pins. This in turn leads to a higher noise production caused by the frame members pivoting with respect to each other.

It is at least likely that because of the above drawbacks the use of friction transmission for driving a conveyor element of the type that forms part of a device as referred to in the introduction has generally been abandoned since U.S. Pat. No. 3,554,360, as may be apparent from the content of the more recent U.S. Pat. Nos. 5,042,648 and 5,394,978. 5,042,648 employs a traditional link chain extending the full length of the conveyor, which chain is driven via at least one horizontally oriented chain wheel. In U.S. Pat. No. 5,394,978, the links of a conveying element that is used are provided with evenly spaced-apart, downwardly extending linear series of teeth. Said teeth are engaged by an endless traditional link chain, which is passed over two vertically oriented chain wheels, one of which is driven. This is how the conveyor element is driven.

An important drawback of the use of chain transmissions in which teeth, which may form part of another separate drive chain, engage in the links of the chain, is in general the noise production resulting from the wear that inevitably occurs. Partly due to the fact that the present noise production, which occurs in particular at the location where the chain is driven, is experienced as objectionable, especially by persons who are continuously present near such chain transmissions for carrying out certain operations, which may lead to (medical) complaints, stringent requirements are made with regard to the admissible noise production. In addition to that, the chain will become elongated during use because of wear. This makes it necessary to use means that ensure that the chain will maintain its correct tension, in spite of the elongation of the chain that occurs. Such means will generally consist of a chain tensioner, which in fact causes the path described by the chain to become larger to an extent that equals the elongation of the chain. Such chain tensioners may be highly complex, in particular when used in conveying systems, because the frame of such a conveying system must be constructed in two parts that are movable relative to each other so as to make it possible to offset the elongation of the chain extending along the frame. As the complexity of the means for maintaining the correct tension of a chain increases, the cost price thereof will increase accordingly, of course. Moreover, in many cases frequent readjustment of the chain tensioners is required, as a consequence of which the system of which the chain in question forms part will be temporarily unavailable for performing its actual function. As the elongation of the chain increases, the engagement between the chain and the (driving) chain wheels will become less intimate, as a result of which the amount of wear and the noise production that is connected therewith will increase, the transmission of forces will take place less efficiently and the chain, including any parts that are connected thereto, will have to be replaced as a whole at a certain point.

The object of the invention is to provide a solution, or at least an improvement with regard to the aforesaid drawbacks, whether in preferred embodiments thereof or not. More specifically it is an object of the invention to provide a low-noise, constructionally simple and low-maintenance conveyor of the kind referred to in the introduction, whether in preferred embodiments thereof or not. In order to achieve that object, the invention is in the first place characterized in that the driven element forms part of the links of the conveying element. As a result, no additional (friction) elements are needed, and consequently no additional means for mounting (friction) elements to the conveying element are needed, either, which makes it possible to use a simpler and more compact conveyor construction. In addition, the magnitude of the bending moments between the links caused by the mechanical transmission via the links can be minimised or even be reduced to zero. Moreover, since the device according to the invention in principle does not require the use of chains, the drawbacks of noise and wear that are connected therewith do not apply.

According to a first preferred embodiment, the driven element comprises a friction surface for driving the conveying element through frictional contact between the drive means and the friction surface. In spite of the fact that friction drive involves contact between the driving element and the driven element, such a method is nevertheless characterized in that it is in principle possible to realise a low-noise drive system, in contrast to a drive system that comprises interlocking teeth and/or chains.

Alternatively, it is preferable for the driving element to comprise a linear motor and for the driven element to comprise a reaction member for cooperation with the linear motor. Such a drive system does not involve any contact between parts thereof, and for that reason alone it will produce less noise. In addition to that, such a drive system is characterized in that the driving element does not comprise any moving parts, unlike the friction drive as described above, for example, so that the noise production is reduced even further and wear will not occur, or at least to a lesser extent.

Although the use of a linear motor is in particular advantageous in the situation in which the driven element forms part of the links of the conveying element, the present advantages are to a significant extent also achieved if the driven element does not form part of the links of the conveying element. Consequently, the present invention in general also relates to a device for conveying products along an endless conveying path, which device comprises a frame, an elongated flexible conveying element supported by the frame, which comprises links that are pivotable relative to each other about vertical pivots, load-carrying platforms each having a supporting surface at the upper side, which supporting surfaces jointly form a substantially closed, common supporting surface for the products, which load-carrying platforms are connected to the conveying element via supports and whose supporting surfaces adjoin each other at curved forward and rearward edges thereof, as well as drive means for driving the conveying element, said drive means comprising a driving element and said conveying element comprising an element driven by said driving element, wherein the drive means comprise a linear motor and wherein the conveying element comprises a reaction member for cooperation with said linear motor.

Preferably, the linear motor extends on two opposite sides of the links, so that the links are loaded evenly which is advantageous also from the viewpoint of noise production.

From an energetic viewpoint it is advantageous if the links are provided with at least one recess at the location of the linear motor. Thus it is possible to have a larger part of the linear motor surrounded by the links and, in addition, to position any opposed parts of the linear motor relatively close together, which makes it possible to achieve a greater energetic efficiency.

Alternatively, or in combination with the preceding two preferred embodiments, it is advantageous if the linear motor extends on the bottom side of the links. This makes it possible to use relatively "flat" links, so that the overall height of the links and the linear motor combined can remain small.

According to another preferred embodiment, adjacent links are interconnected via a fixable pin member that is pivotable between two pivoted positions, with respect to which pin member the links can pivot, said pin member comprising a first pin member part having a first-vertical central axis for pivoting movement of one of the adjacent links about the first pin member part, and a second pin member part having a second vertical central axis for pivoting movement of the other one of said adjacent links about the second pin member part, which first and second central axes are spaced some distance apart. This makes it possible to offset any elongation of the conveying element by changing the pitch between links, which is done by adjusting the pivoted position of the pin member and fixing the pin member in that position. The fact that the first central axis and the second central axis are spaced some distance apart makes it possible to adjust the spacing between adjacent links in this manner. Said adjustment need not take place for all the adjacent links simultaneously, so that the pin members that are used can be pivoted to a particular position and be fixed in that position in succession, with the smallest spacing being present between the adjacent links interconnected by the pin member in question, at regular intervals in the course of time. Thus it is possible to maintain a substantially constant overall length of the conveying element, so that it will not be necessary to use means for maintaining the desired tension of the conveying element, and furthermore it will not be necessary to adapt the length of the frame along which the conveying element extends.

Preferably, each link comprises two sublinks, which sublinks are pivotable with respect to each other about a horizontal pivot. Thus, advantageous preconditions are created for having the conveying element, and thus the load-carrying platforms, move along a three-dimensional path.

In order to enable the conveying element to move along a three-dimensional path, each load-carrying platform preferably comprises two platform parts which are pivotable with respect to each other about a horizontal pivot.

It is very advantageous in this connection if the horizontal pivot associated with two platform parts extends at least substantially straight above a horizontal pivot associated with two. sublinks, so that said pivots are positioned as close together as possible and simultaneous pivoting movement will less likely lead to mechanical limitations.

In particular, but not exclusively, in order to enable the conveying element to move through a vertical curve, adjacent load-carrying platforms preferably overlap under the associated supporting surfaces at the curved forward edges and the curved rearward edges, so that the load-carrying platforms will jointly form a closed supporting surface, without any dangerous seams present therebetween, also when moving through a (vertical) curve.

In explanation of the following it is noted that the longitudinal direction is understood to be a direction parallel to the direction of movement of the common supporting surface or parallel to the longitudinal direction of the conveying element. The transverse direction is understood to be the direction parallel to the common supporting surface, perpendicular to the longitudinal direction. In those cases where mention is made of the length of a supporting surface, it is the dimension of the supporting surface in question in the longitudinal direction between the centres of the associated rearward and forward edges that is meant. The width of a supporting surface concerns the maximum dimension in transverse direction of a supporting surface in question.

The length of at least one supporting surface is preferably different from the lengths of other supporting surfaces. This makes it possible to prevent the development over time of overly large seams between adjacent load-carrying platforms due to wear.

In particular, but not exclusively, in order to be able to have the length of at least one supporting surface differ from the length of other supporting surfaces, at least one load-carrying platform comprises first adjusting means for adjusting the length of the associated supporting surface. Thus it is possible to adapt the length of the at least one supporting surface in question to the elongation of the conveying element that occurs over time. With the present preferred embodiment it is also possible, however, to provide all the load-carrying platforms with first adjusting means, so that the compensation of the length increase of the conveying element will be evenly distributed over the supporting surfaces of all the load-carrying platforms. Thus, the actual situation may be that all the supporting surfaces still have the same length.

Likewise in order to compensate an undesirable increase of the length of the conveying element due to wear, the length of at least one link is preferably different from the length of other links. The present preferred embodiment provides a possibility of exchanging one link or a number of links for shorter links if the conveying element has undergone an undesirable elongation, so that the overall length of the conveying element is reduced.

In particular, but not exclusively, in order to be able to have the length of a link differ from the length of other links, it will be advantageous if at least one link comprises second adjusting means for adjusting the length of said at least one link. Thus the length of the at least one link in question can be adapted in order to offset the elongation of the conveying element that occurs over time, so that the conveying element will regain its original length. Comparable to the use of the first adjusting means as described above, it is in principle also possible when using the second adjusting means to provide all the links with second adjusting means, so that the compensation of the length increase will be evenly distributed over all the links of the conveying element. Thus the actual situation may be that all the supporting surfaces still have the same length.

As an aside it is noted that the preferred embodiments described above with regard to the aspects of a different length of at least one link in comparison with other links and the changing of the length of at least one link, using second adjusting means, can also be used with prior art conveyors, without the links necessarily forming part of the conveying element and/or without the load-carrying platforms necessarily adjoining each other at their forward and rearward edges and/or without said forward and rearward edges necessarily abutting upon each other. Without the aforesaid aspects, the device would be a device for conveying products, comprising a frame, an elongated flexible conveying element supported by the frame, which comprises links that are pivotable relative to each other about vertical pivots, load-carrying platforms each having a supporting surface at the upper side, which supporting surfaces jointly form a substantially closed, common supporting surface for the products, which load-carrying platforms are connected to the conveying element via supports, as well as drive means for driving the conveying element through frictional contact between the drive means and a friction surface of the conveying element. By way of illustration, luggage carrousel systems, such as the systems that are generally encountered in arrival halls of airports, in particular European airports, may be considered in this connection, which systems comprise load-carrying platforms fitted with overlapping rubber flaps.

According to another preferred embodiment, the proportion between the length and the width of the supporting surfaces is maximally 0.4, more preferably maximally 0.3. Such a proportion is considerably lower than similar proportions of supporting surfaces with adjoining curved forward and rearward edges as used in prior art conveyors, which known proportions amount to 0.5 or more. An important advantage of this is that the size of any undercuts in the load-carrying platforms can be minimised, or that such undercuts can be left out altogether. Such cuts are necessary when using load-carrying platforms according to the prior art, which exhibit contours as shown in FIG. 2, for example, in order to enable the successive load-carrying platforms to move through curves. In FIG. 2, numerals 38a and 38b indicate undercuts. At said locations there is a certain risk of (parts of) objects or persons getting wedged between adjacent load-carrying platforms, and for that reason a screening edge, which is fixedly connected to the frame, is generally provided directly above the load-carrying platforms, on either side thereof. In this way objects or persons are prevented from getting wedged between adjacent load-carrying platforms. As a result of the presence of the fixed screening edges, the outer parts (seen in transverse direction) of the common supporting surface cannot be utilised as a conveying surface. In addition, as the width of the screening edges increases, persons have to reach further forward in order to pick up objects from the common supporting surface. In the case of a luggage carrousel at an airport, said persons are passengers or personnel removing luggage from the carrousel. The present preferred embodiment makes it possible to use smaller undercuts in the load-carrying platforms, or to leave out such undercuts altogether, thus making it possible in the first place to reduce the width of the screening present thereabove or leave out such screening altogether, and in the second place to make a (comparatively) larger part of the (width of the) common supporting surface actually available for supporting and conveying objects.

It will be apparent to those skilled in the art that the above proportion as used in the present preferred embodiment can also be used advantageously in conveyors in which the conveying element is driven in a different manner than by means of frictional contact between driving means and a friction surface of the conveying element, for example by means of interlocking teeth or by means of an inductive, contactless drive system. In such a situation the device for conveying products is a device comprising a frame, an elongated flexible conveying element supported by the frame, which comprises links that are pivotable relative to each other about vertical pivots, load-carrying platforms each having a supporting surface at the upper side, which supporting surfaces jointly form a substantially closed, common supporting surface for the products, which load-carrying platforms are connected to the conveying element via supports and whose supporting surfaces adjoin each other at curved forward and rearward edges thereof, as well as drive means for driving the conveying element.

Especially in combination with the aforesaid advantageous proportion between the length and the width of the supporting surfaces, at least one longitudinal side of the common supporting surface is preferably free from any screening present thereabove over at least part of the length of the common supporting surface. The common supporting surface of the device according to the invention comprises two longitudinal sides, viz. one longitudinal side located on the inner side of the endless conveying path and one longitudinal side located on the outer side of the endless conveying path. When a device according to the invention is used at airports, where the products to be conveyed are pieces of luggage, it is major advantage of this arrangement that the pieces of luggage need not be lifted over a screening upon removal of pieces of luggage from the common supporting surface, with the attendant risk of the pieces of luggage being damaged by catching on the screening. When the present preferred embodiment is used, the pieces of luggage can simply be moved off the common supporting surface to one side, which entails a much smaller physical effort, without any risk of the pieces of luggage being damaged. It will be apparent that the length of the common supporting surface that is free from any screening must at least equal the main dimensions of the pieces of luggage. Preferably, said length is a few meters, for example at least 2 meters, in order to provide sufficient space for passengers standing beside each other.

Extension of the available width of the common supporting surface can also be realised if, according to another preferred embodiment of the invention, a screening edge having a width of maximally 5.0 cm, preferably maximally 3.0 cm, is used above at least one longitudinal side of the common supporting surface over at least part of the length of the common supporting surface.

Especially in combination with the preferred embodiment as described above, in which at least one longitudinal side of the common supporting surfaces is free from any upwardly extending screening over at least part of the length of the common supporting surface, a screening edge is preferably present under at least one longitudinal side of the common supporting surface, at a distance of maximally 1.0 cm from the load-carrying platforms over at least part of the length of the common supporting surface. Such a screening edge prevents (parts of) persons or objects (in particular children's fingers) getting wedged between the bottom side of a load-carrying platform and a vertical screening edge of the device directly below and outside the common supporting surface, near said at least one longitudinal side thereof.

The advantages of the above preferred embodiments that relate to the embodiment of the device at the location of at least one longitudinal side of the common supporting surface thereof in particular apply if the longitudinal side in question is located on the outer side of the endless conveying path, since passengers or airport personnel will normally be present on the outer side of said conveying path.

According to another preferred embodiment of the invention, each load-carrying platform is supported by at least three supports. The major advantage of such a preferred embodiment over the prior art, in which each load-carrying platform is supported by two supports, is the fact that the load-carrying platform can be made thinner and thus less heavy.

The invention will be explained in more detail hereinafter by means of a description of two preferred embodiments of a conveyor according to the invention, in which reference is made to the following figures:

FIG. 2 shows a load-carrying disc forming part of the conveyor that is shown in FIG. 1;

FIG. 3 is a schematic cross-sectional view along the line III-III in FIG. 1;

FIGS. 4a and 4b are a vertical cross-sectional view and a top plan view, respectively, of two links that form part of a conveying element of the conveyor that is shown in FIG. 1, in which the links are shown in a first position thereof;

FIGS. 5a and 5b are a vertical cross-sectional view and a top plan view, respectively, of the two links that are shown in FIG. 1, in which the links are shown in a second position thereof;

FIGS. 6a and 6b are a schematic side elevation and a schematic top plan view, respectively, of a second embodiment of a conveyor according to the invention;

FIG. 12a is a schematic, vertical cross-sectional view, comparable to the view of FIG. 3, of a third preferred embodiment of the conveyor according to the invention;

FIG. 12b shows a variant of the embodiment that is shown in FIG. 12a;

Insofar as it cannot lead to confusion, like parts will be indicated by the same numerals hereinafter.

Figure 1:
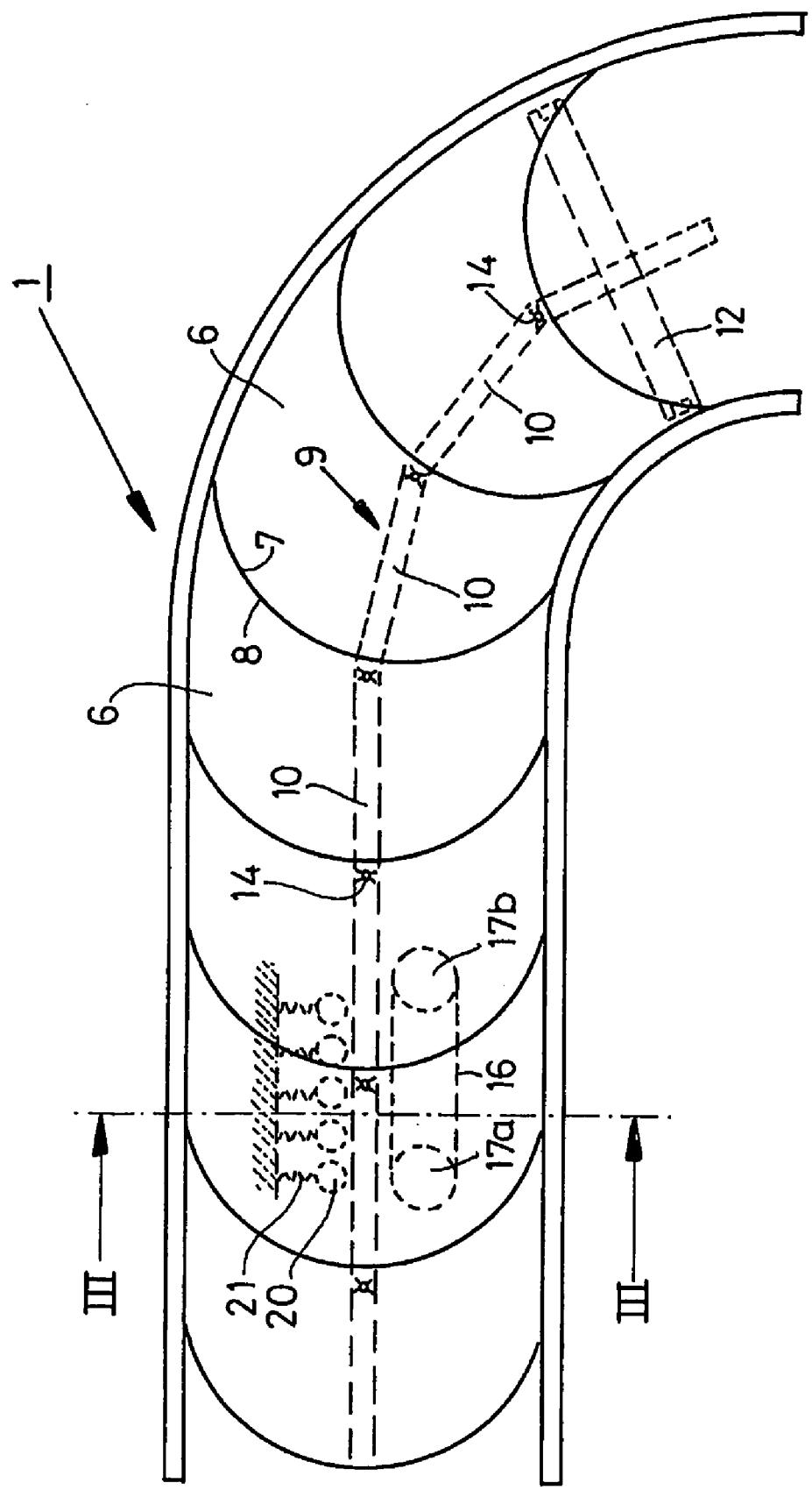
FIG. 1 is a schematic top plan view of a first embodiment of a conveyor according to the invention.

FIGS. 1 and 3 show (a part of) a conveyor 1. The conveyor 1 comprises a frame 2 having legs 3, bearing surfaces 4a, 4b and a guide slot 5 defining a conveying path. Successive load-carrying platforms 6 are movable along the frame 2 at the upper side thereof. The load-carrying platforms 6 (see FIG. 2) are identical in shape and have a convexly curved forward edge 7 and concavely curved rearward edge 8. The radii of curvature of the forward edge 7 and the rearward edge 8 are identical to each other, so that the successive load-carrying platforms abut each other closely, jointly forming a common supporting surface, as it were.

An endless flexible conveying element 9 extends below the load-carrying platforms, which conveying element comprises links 10 which are pivotable about pivots 14, which links will be explained in more detail yet with reference to FIGS. 4a-5b. A rigid connection is formed between each link 10 and each load-carrying platform 6 via connecting pins 11 and crossbeams 12 (only one of which is shown in FIG. 1), which are rigidly connected at right angles to each other. The crossbeam 12 is also rigidly connected to the associated load-carrying platform 6 at the location of the connecting points 13a, 13b. A wheel 19a, 19b is mounted to both ends of each crossbeam 12, which wheel rolls on bearing surfaces 4a, 4b of the frame 2, thus providing support for the load-carrying platforms 6. It is noted in this connection that the crossbeams 12 are present at the rearward edge 8 of the load-carrying platform 6 that is connected thereto, so that the crossbeam 12 supports not only the load-carrying platform 6 that is connected thereto, but also the load-carrying platform 6 that abuts said platform at the rear side thereof, and that near the forward edge 7 of said platform.

The pivot 14 extends through the centre of the curvature of the forward edge 7 of the load-carrying platform 6 positioned thereabove. Consequently, the common supporting surface is maintained also while the conveying element moves through curves, without this having any influence on the width of the seams between adjacent load-carrying platforms. In order to prevent the ends 39a, 39b of a load-carrying platform 6 projecting "into" a load-carrying platform 6 positioned behind the platform 6 in question when moving through a curve, the load-carrying platforms 6 are provided with undercuts 38a, 38b, which provide room for the ends 39a, 39b in a curve. The contour of the load-carrying platforms 6 extends inwards at the location of the undercuts 38a, 38b. At the undercuts 38a, 38b there is a risk of (parts of) objects and/or persons becoming wedged between two adjacent load-carrying platforms. For that reason a screening edge 70a, 70b is provided on either side of the common supporting surface formed by the load-carrying platforms 6, so that said areas are not accessible to objects and/or persons. A follower wheel 22 present at each pivot 14, which follows the path of the guide slot 5, enables the conveying element to move through curves.

Drive means 15 are provided under the load-carrying platforms 6 along the conveying path, which drive means are fixedly connected to the frame 2. If necessary, a plurality of the drive means may be provided along the conveying path if the length of the conveying if the length of the conveying path renders this necessary. The drive means 15 comprise an endless friction belt 16 present on one longitudinal side of the links 10, which belt is passed over pulleys 17a, 17b that are rotatable about vertical axes, one of which is rotated by a motor (not shown). Although the friction belt 16 and the links 10 are spaced apart in FIG. 1 for the sake of clarity, the outer side of the friction belt facing towards the links 10 engages the flat vertical outer side 18a of the links 10 during operation. A plurality of hold-down rollers 20 are provided on the opposite longitudinal side of the links 10, which hold-down rollers press down on the vertical outer side 18b of the links 10 under the influence of the spring force of springs 21, thus providing a proper contact between the friction belt 16 and the links 10. In this way the movement of the friction belt 16 is transmitted to the links 10, and thus to the load-carrying platforms 16, through friction forces.

With reference to FIGS. 4a and 4b, two adjacent links are pivotally connected by means of an eccentric connecting pin element 23. At their front end, the links 10 are centrally (seen in vertical direction) provided with a single projecting part 24, in which a bore 25 is present. Two projecting parts 26a, 26b, which form part of the rear side of a next link 10, extend above and below said projecting part 24. Said projecting parts 26a, 26b, too, are provided with (concentric) bores. The connecting pin element 23 extends through the aligned bores in the projecting parts 24, 26a, 26b. The connecting pin element 23 comprises two abutting bushes 27a, 27b, which define an eccentric hexagonal passage in their abutting position, through which a pin 28 extends. The eccentricity of said passage relates to the part of the connecting pin element 23 that extends within the height of the projecting parts 26a, 26b, it does not apply to the part of the connecting pin element 23 that extends within the height of the projecting part 24. The pin 28 is provided with a bolt hole 36 at its upper end for realising a screwed connection, by means of a bolt having a recessed head, with the load-carrying platform 6 positioned thereabove at the position indicated by numeral 30c. The pin 28, which is hexagonal in section above the line of separation 33, just like the passage through which the pin 28 extends, and circular in section below the line of separation 33, ensures that the bushes 27a, 27b properly abut each other by retaining the bushes 27a, 27b in their relative positions by means of a cotter pin 29 at the upper side, which extends through the pin 28, and by means of a retaining ring 30 at the bottom side, which extends in a groove in the pin 28. The ring 30 also retains the bearing 31 for the guide wheel 22. The lower bush 27b abuts with its flange 34 against the bottom side of the link 10, more specifically against the bottom side of the projecting parts 26b thereof. The upper bush 27a has a flange 35, in which two diametrical grooves are present. Two projections 32a, 32b slipping into said grooves are formed on the upper side of the projecting part 26a. When the cotter pin 29 is removed, it becomes possible to lift the upper bush 27a slightly, such that the projections 32a, 32b are moved clear of the associated grooves. Rotation of the connecting pin element 23 through 180 degrees leads to the situation that is shown in FIGS. 5a and 5b. The connecting pin element 23 is locked in this position by lowering the upper bush 27a again, so that the projections 32a, 32b will slip into the associated grooves again, and subsequently fitting the cotter pin 29. Because of the eccentric shape of the connecting pin element 23, the central axis of the central part thereof is moved-in the conveying direction. Thus the spacing between the links 10 can be varied between two positions. This applies with regard to all the adjacent links 10, of course, so that a constant length of the conveying element 9 can be maintained, in spite of the connecting pin elements 23 and the links 10 thereof being subject to wear. Upon installation of the conveying element 9 it is best, of course, to position the connecting pin elements 23 such that a maximum spacing is maintained between adjacent links 10.

The conveyor 51 that is shown in FIGS. 6a and 6b comprises load-carrying platforms 52 and links 54 which are pivotable with respect to each other about vertical pivots 53, together forming a conveying element. Said conveying element is driven in the same manner as already explained above in the description of a first preferred embodiment of the invention. Each link 54 comprises two sublinks, viz. a shorter sublink 55 and a long sublink 56, which are pivotable with respect to each other about horizontal pivots 57, to which end horizontally oriented pins are provided between the sublinks 55, 56, about which pins the sublinks 55, 56 can pivot with respect to each other.

The load-carrying platforms 52 have a supporting surface 65, each having a convexly curved forward edge 61 and a concavely curved rearrange 62, for reasons that have already been explained above in connection with the first preferred embodiment. Similarly to the links 54, the load-carrying platforms 52 comprise two parts which are pivotable with respect to each other about horizontal pivots 58, viz. a short platform part 59 and a long platform part 60 comprising a short supporting surface portion 66 and a long supporting surface portion 67, respectively. One load-carrying platform 52 is provided for each link 54, which load-carrying platform is connected to the link. More specifically, said connection is effected via the short sublink 55 of the link 54 and a short platform part 59 of the load-carrying platform 52. Starting from a horizontal orientation of the links 54, the horizontal pivots 57 and 58 are positioned straight above one another.

The overall length of the conveying element as made up by the successive links 54, which form an endless loop, does not change when the conveying element moves through a curve in the horizontal plane, nor does it change when the conveying element moves through a curve in the vertical plane, as is shown in FIG. 6a. The consequence of this is, however, that the forward edge 61 and the rearward edge 62 of adjacent load-carrying platforms 52 will either move towards each other upon moving through vertical curves or, on the contrary, away from each other, depending on the direction of the curve. In order to prevent unacceptably large seams developing between adjacent load-carrying platforms 52, or to prevent said platforms moving into each other when moving through vertical curves as a result of said inevitable relative movement between adjacent load-carrying platforms 52, each short platform part 59 has a rearwardly extending edge 63 below the level of the supporting surface, which edge extends within a groove 64 on the front side of a rearward long platform part 60. Both the edge 63 and the groove 64 extend the entire width of the platform parts 52 and conform to the curved shapes of the forward edge 61 and the rearward edge 62. This achieves that the gap between the forward edge 61 and the rearward edge 62, just below the vertical level thereof, is filled by the edge 63 extending within the groove 64, so that a closed, common supporting surface is nevertheless obtained. Although the lower leg 68 of the groove 64 extends the entire width of the platform parts 52 in the present preferred embodiment, this is not necessary. Alternatively, the leg 68 might be substituted for one or more forwardly extending fingers having a limited width.

Figure 7A:
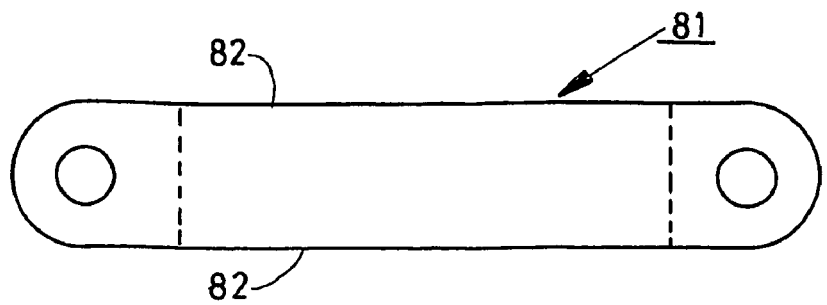
FIGS. 7a and 7b are a schematic top plan view and a side elevation, respectively, of a fixed link.
Figure 7B:
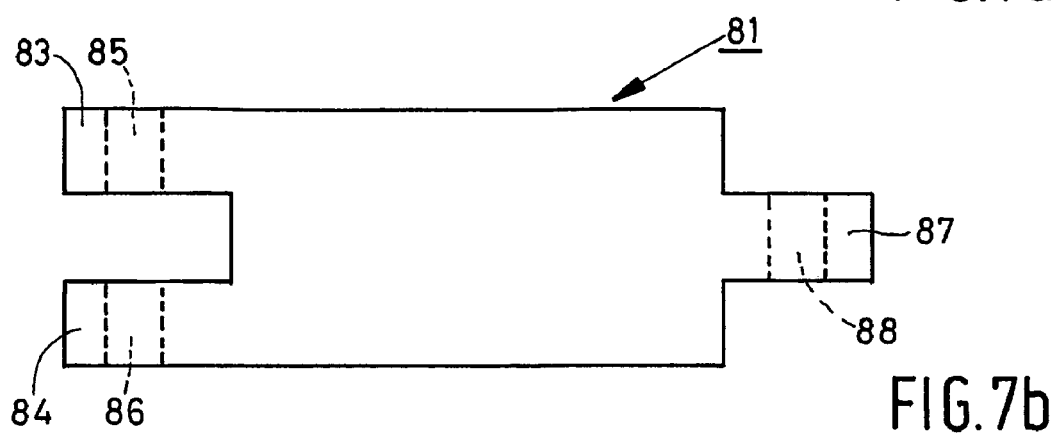

FIGS. 7a and 7b schematically show a top plan view and a side elevation, respectively, of a link 81 that forms part of a conveying element as can be used with the present invention. Friction surfaces 82 are present on the sides of the link 81, which friction surfaces can be engaged by a friction wheel or the like forming part of drive means for the conveying element. The link has an upper projecting edge 83 and a lower projecting edge 84 at one end thereof, which edges are provided with aligned bores 85 and 86, respectively. Present at the opposite end of the link 81 is a middle projecting edge 87, likewise provided with a bore 88. The middle projecting edge 87 can be placed between the upper projecting edge 83 and the lower projecting edge 84 of an adjacent link 81, such that the bores 85, 86, 88 are aligned, so that a pivot pin can extend therethrough, enabling the adjacent links 81 to pivot with respect to each other about the central axis of said pivot pin (not shown).

In use, the conveying elements of which the links 81 form part are inevitably subject to wear, so that the conveying element will become longer, which is undesirable, because this will lead to the conveyor producing more objectionable noise during operation and possibly to failure of the conveyor. In order to reduce the length of the conveying element to its original value again, links having eccentric connecting pin elements may be used, as already explained before with reference to FIGS. 4a-5b. Alternatively (and theoretically even in combination therewith) it is possible to exchange one or more links 81 for other links which are practically identical to the links 81, but which have a shorter length. It is also possible to exchange two links 81 for a single link that is practically identical to the link 81, except for its greater length, which length is smaller than the combined length of the two links 81 that are being replaced, of course.

Figure 8A:
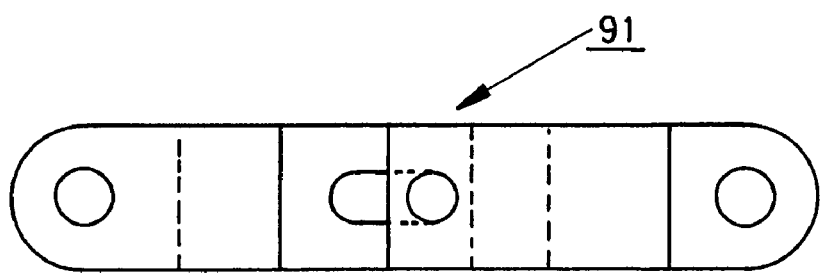
FIGS. 8a and 8b are a schematic top plan view and a schematic side elevation, respectively, of a link which is adjustable for length.
Figure 8B:
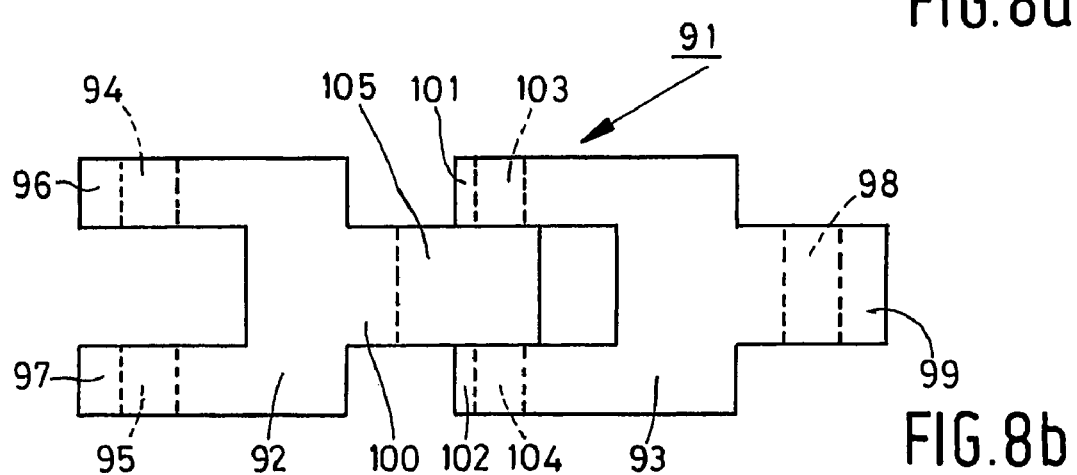

Alternatively (or even in combination therewith), it is possible to use adjustable links, one of which is schematically shown in top plan view and in side elevation in FIGS. 8a and 8b, respectively. The adjustable link 91 comprises two interconnected sublinks 92, 93. In the position in which the adjustable link 91 has its greatest length, as shown in FIGS. 8a and 8b, the spacing between the bores 94, 95 in the upper projecting edge 96 and the lower projecting edge 97, respectively, of the sublink 92 and the bore 98 of the middle projecting edge 99 of the sublink 93 is identical to the spacing between the bores 85, 86 on the one hand and the bore 88 of the link 81 on the other hand.

On their facing sides, the sublinks 92 and 93 are provided with a middle projecting edge 100 on, the one hand and an upper projecting edge 101 and a lower projecting edge 102 on the other hand. Aligned bores 103, 104 are present in the upper and lower projecting edges 101, 102, respectively. A slotted hole 105 is present in the middle projecting edge 100. It is possible to adjust a desired spacing between the bores 94, 95 on the one hand and the bore 98 on the other hand by moving the sublinks 92, 93 towards or away from each other so as to offset the elongation that the conveying element, of which the adjustable link 91 forms part, has undergone over time. The sublinks 92, 93 can be locked in a specific relative position by means of a nut-bolt combination, with the bolt extending through the bores 103, 104 and the slotted hole 105, by clamping the facing sides of the projecting edges 101, 102 against the upper side and the lower side of the middle projecting, edge 100. Thus it is possible to change the length of the adjustable link 91 within the boundaries defined by the length of the slotted hole 105.

Figure 9A:
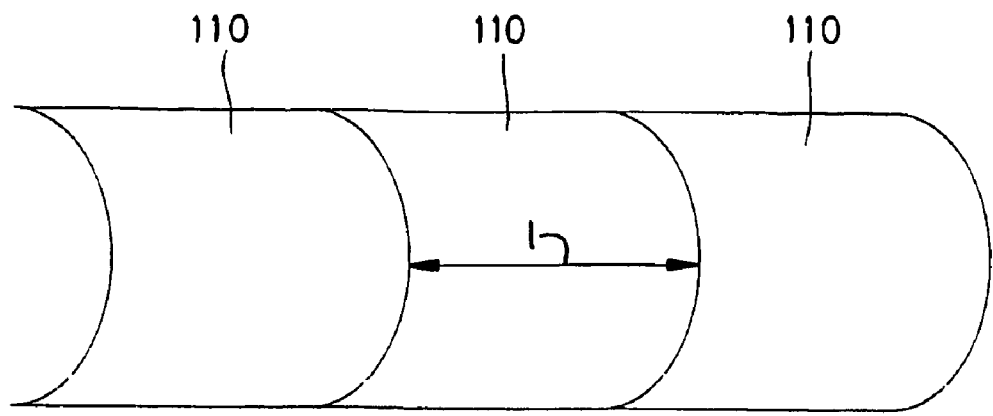
FIG. 9a is a top plan view of three successive load-carrying platforms.
Figure 9B:
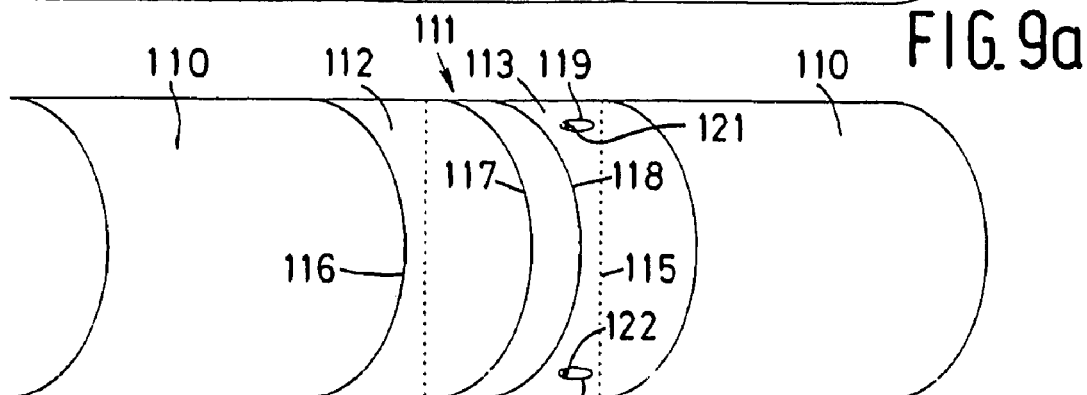
FIG. 9b is a view of the load-carrying platforms of FIG. 9a, in which the middle load-carrying platforms has been exchanged for a load-carrying platform which is adjustable for length.

Because of the above-mentioned inevitable elongation of the conveying element that forms part of the conveyor according to the invention, there is a risk that the seams between adjacent load-carrying platforms will become larger to an unacceptable extent. In order to provide a solution to this problem, the present invention provides a possibility of using a variable length of the load-carrying platforms. FIG. 9a shows in top plan view three successive load-carrying platforms 110, which are fully comparable to the load-carrying platforms 6 that have been explained in the foregoing, for example with reference to FIG. 1. Said load-carrying platforms 110 all have the same length l. In FIG. 9b, the middle load-carrying platform 110 has been exchanged for an adjustable load-carrying platform 111. The adjustable load-carrying platform 111 comprises two subplatforms 112, 113, which are interconnected at their bottom sides via the connecting plate 114 (also refer to FIG. 9d), whose forward edge 115 and rearward edge 116 are illustrated in dotted lines in FIG. 9b. The facing edges 117, 118 of the subplatforms 112, 113 are curved, just like the forward and rearward edges of the load-carrying platforms 110, so that the edges 117, 118 will hardly stand out in the whole of the common supporting surface that is formed by the load-carrying platforms 110 and 111. Alternatively, it is also possible to use a different shape for the edges 117, 118, for example a rectilinear shape or a serrated shape.

Figure 9C:
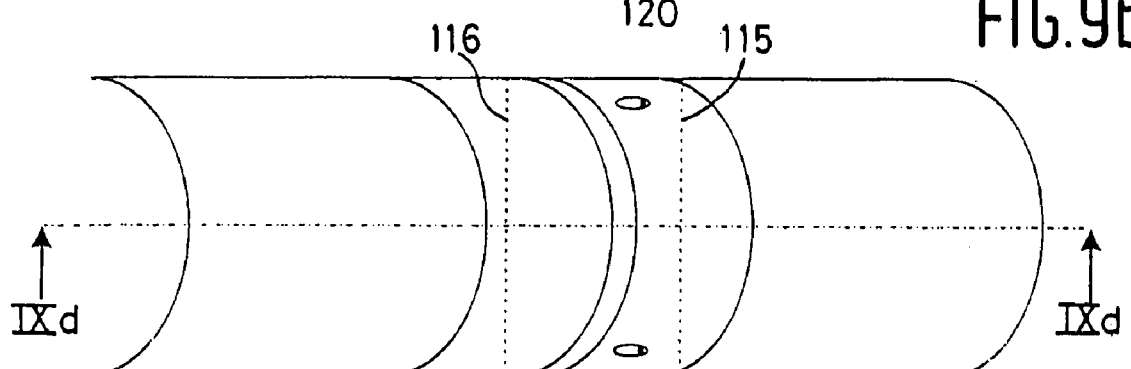
FIG. 9c is a view of the load-carrying platforms of FIG. 9b, in which a shorter length for the middle load-carrying platform has been adjusted.
Figure 9D:
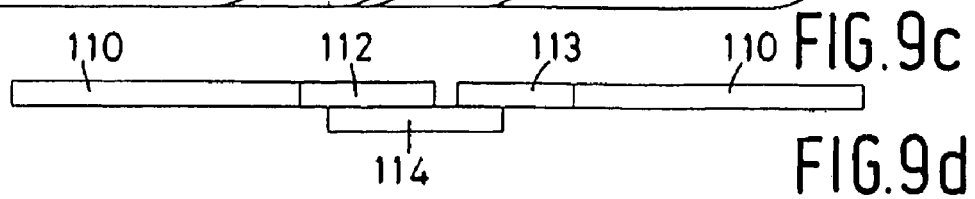
FIG. 9d is a cross-sectional view along the line IXd-IXd in FIG. 9c.

Two slotted holes 119, 120 are present in the subplatform 113, near the side thereof. Bores 121, 122 are present under the slotted holes 119, 120 in the connecting plate 114 that is fixed to the sub-platform 112. The length of the adjustable load-carrying platform 111 can be adjusted within the boundaries defined by the length of the slotted holes 119, 120 by means of suitable nut-bolt combinations, with the bolt extending through the slotted holes 119, 120 and the bores 121, 122. Thus, FIG. 9b shows the greatest length of the load-carrying platform 111, whilst FIG. 9c shows the smallest length of the load-carrying platform 111.

Figure 10:
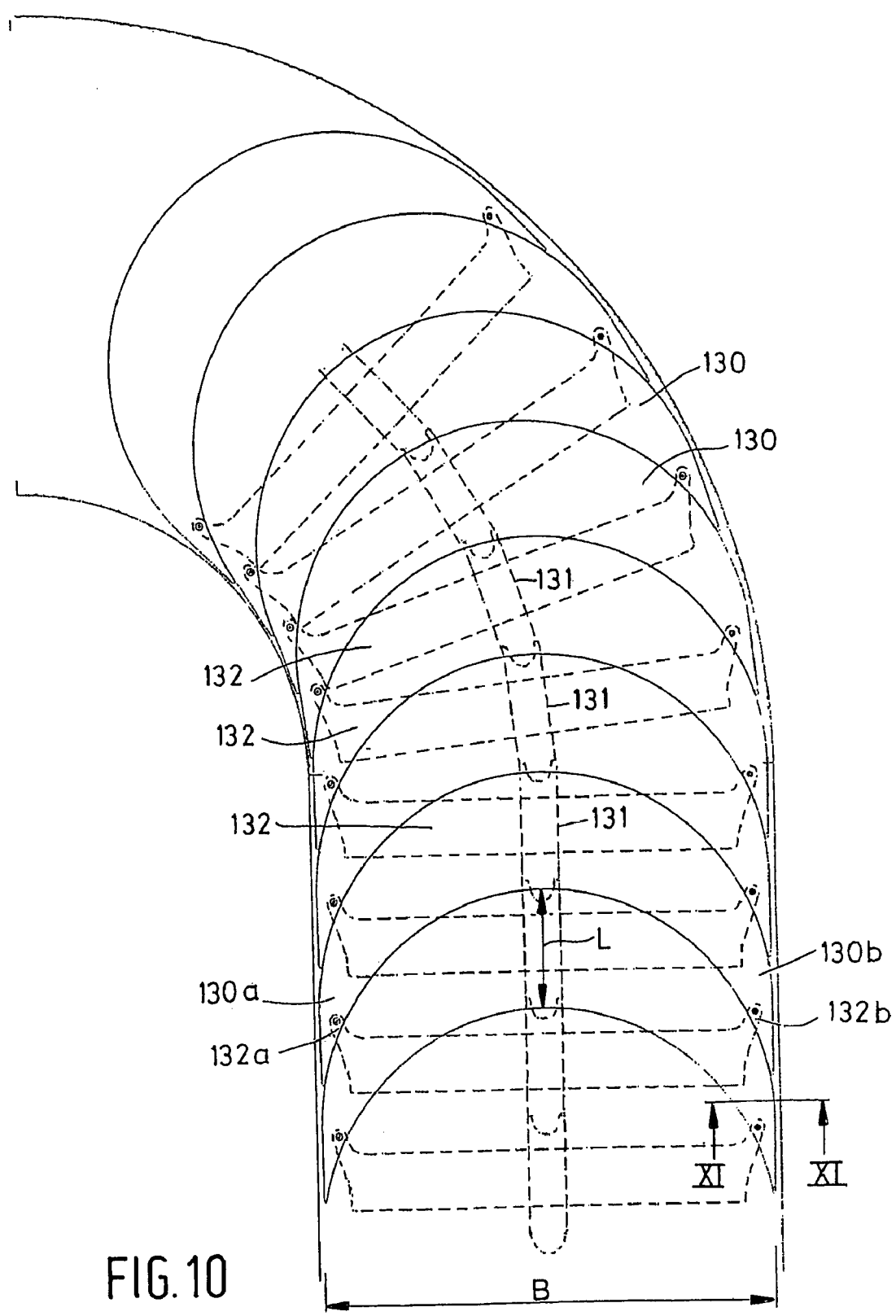
FIG. 10 is a top plan view of a number of successive load-carrying platforms.

FIG. 10 shows in top plan view a number of successive load-carrying platforms 130. Furthermore, mutually pivotable links 131 are illustrated in dotted lines, which links are each connected to a load-carrying platform 130 by means of crossbeams 132. The load-carrying platforms 130, the links 131 and the crossbeams 132 are present in identical numbers, therefore. Characteristic of this preferred embodiment of the present invention is the geometry, seen in top plan view, of the load-carrying platforms 130, more specifically the proportion between the length L and the width B thereof, which is approximately 0.25 in the present embodiment. As a result of this relatively small proportion, the extent of the mutual angular distortion of adjacent load-carrying platforms 130 in curves remains limited, so that the risk of getting wedged is considerably reduced. As a result, the screening present above the load-carrying platforms at the end of the seams between adjacent load-carrying platforms 130 (comparable to the screens 70a, 70b in FIGS. 1 and 3) may have a relatively small width, or, as will be discussed in more detail yet below, be left out altogether, so that a relatively large part of the (width of) the joint supporting surface formed by the load-carrying platforms 130 will be available for supporting and conveying objects and people need to reach less far for lifting the objects from the common supporting surface or, on the contrary, placing said objects onto said surface.

Figure 11A:
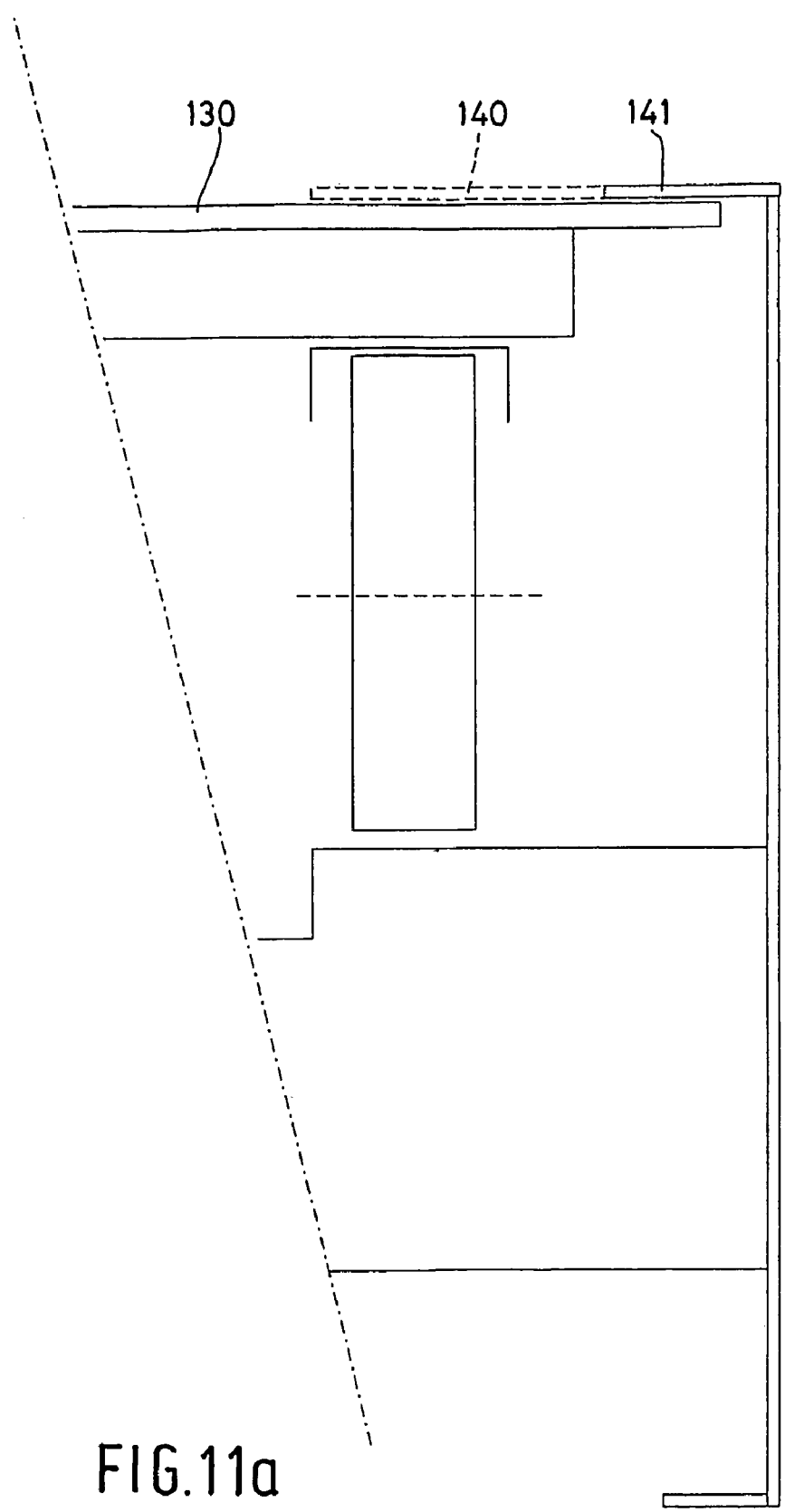
FIG. 11a is a cross-sectional view along the line XI-XI in FIG. 10, showing a first embodiment.

Due in particular to the advantageous length-width proportion of the load-carrying platforms as described above, the undercuts, which are still required when using load-carrying platforms such as the load-carrying platform 6 that is shown in FIG. 2, may be left out altogether when the present load-carrying platforms 130 are used. Partly because of this arrangement, the risk of (parts of) objects or persons getting wedged between adjacent load-carrying platforms 130 is significantly reduced. Thus, the width of the screens present on the sides, above the common supporting surface, can be considerably reduced, which is illustrated in FIG. 11a, in which figure dotted lines illustrate the required width of about 8 cm of the screen 140 that would be necessary if prior art load-carrying platforms (for example the load-carrying platforms that are shown in FIG. 2) would be used, wherein the proportion between the length and the width amounts to 0.5 or more. Thanks to the advantageous length-width proportion of the load-carrying platforms 130 as described above, the width of the screen 141 can reasonably be limited to approximately 3 cm, as a result of which the available width of the common supporting surface for objects to be transported will increase by 10 cm, assuming that the screen 141 is also present on the other longitudinal side.

Figure 11B:
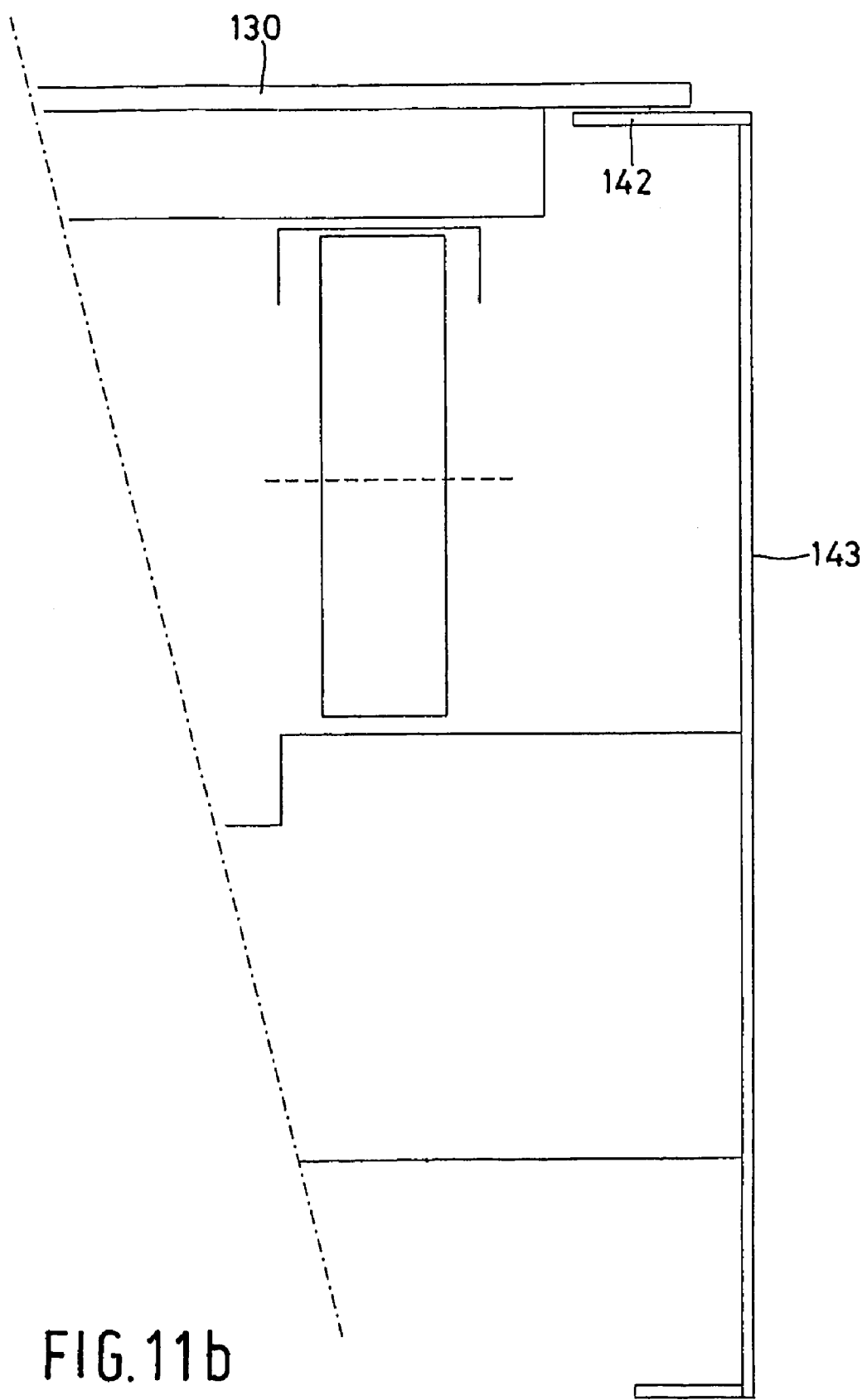
FIG. 11b is a cross-sectional view along the line XI-XI in FIG. 10, showing a second preferred embodiment.

The danger of objects and/or persons getting wedged may even be considered to be so small that it is decided not to mount the screening edge above the load-carrying platforms 130 but just below said platforms. This situation is shown in FIG. 11b, in which the screening edge 142 extends in horizontal direction under the successive load-carrying platforms 130, being spaced therefrom by a distance such that a gap of about 0.2 cm is present between the load-carrying platforms 130 and the screening edge 142. Said screening edge 142 prevents (parts of) persons or objects getting wedged between the load-carrying platforms 130 and the vertical screening edge 143, from the upper side of which the screening edge 142 extends inwardly.

Due to the specific shape of the load-carrying platforms 130 combined with the pitch thereof, it is major advantage that each of the load-carrying platforms 130 are supported by three subsequent crossbeams 132. To this end each crossbeam 132 at the ends thereof is provided with two projecting parts 132a, 132b, at which location rigid connections of a load-carrying platform 130 via ends 130a, 130b are made. The load-carrying platform 130 in question is also supported by two adjacent crossbeams 132.

Unlike the preferred embodiments that have been described so far, the conveyor 151 that is shown in FIG. 12a does not have a friction drive system but a contactless drive system, using a linear motor 152 disposed on either side of the links 153. The links 153 function as reaction members for the linear motors 152, they may be substantially similar to the links that are used in the preferred embodiments as discussed before. If necessary, a ferromagnetic material may be added to the links for conducting the magnetic field that is generated by the linear motor 152. Said material might consist of steel plates mounted to the links 153, for example, preferably on the side thereof that faces towards the linear motor 152.

The linear motor 152 is connected to the frame 154 and extends along a limited part of the conveying path as a whole, which part extends perpendicularly to the plane of drawing of FIG. 12a. For the rest the conveyor 151 is not essentially different from the preferred embodiments that have been discussed before. The load-carrying platforms 155 of said conveyor are each connected to a link 153; at their bottom side, at the location of their cross ends, the platforms are fitted with two running wheels 156, which roll on guide surfaces 157 that form part of the frame of the conveyor 151. A guide wheel 158 is provided under the links 153, which guide wheel is laterally retained by guide strips 159 defining the conveying part of the conveyor 151. The conveyor 161 that is shown in FIG. 12b is only different from the conveyor 151 as regards the configuration of the links 162 thereof and, connected therewith, the position of the linear motor 163. The links 162 are provided with recesses 164 on the sides where the linear motor 163 is present, within which recesses the linear motor 163 extends. Thus, a greater portion of the two parts of the linear motor 163 is surrounded by the links 162, and the two parts of the linear motor 163 are positioned closer together, resulting in an improved electric-energetic efficiency of this transmission.

Figure 13A:
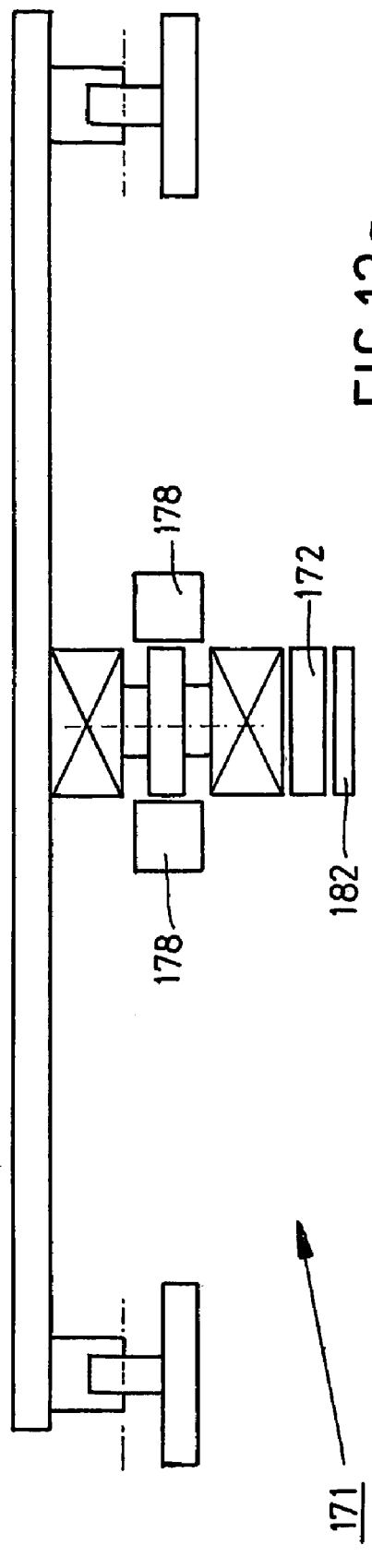
FIG. 13a is a schematic side elevation of a fourth preferred embodiment.
Figure 13B:
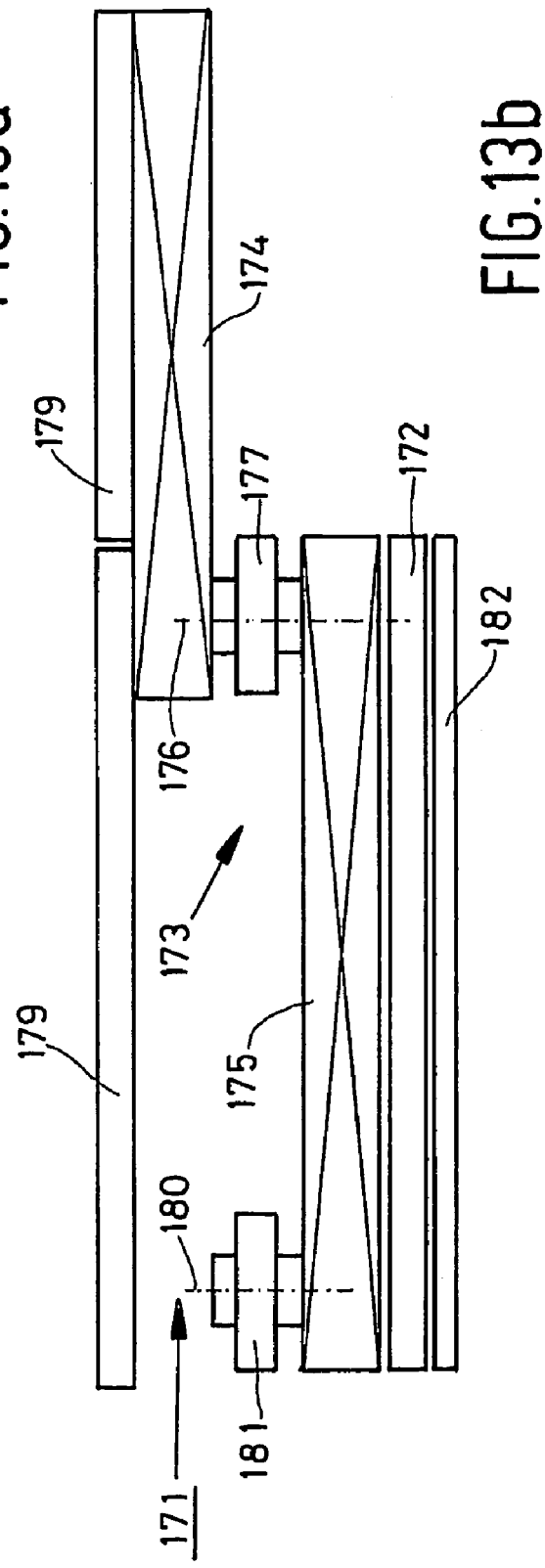
FIG. 13b is a schematic side elevation of said fourth preferred embodiment.

With the conveyor 171 that is shown in FIGS. 13a and 13b, the linear motor 172 that is fixedly connected to the frame 182 is disposed directly below the links 173, although it does not make contact therewith. Each link 173 consists of an upper link part 174 and a lower link part 175. The link parts 174 and 175 are interconnected by means of a pivot pin, whose central axis 176 is shown in FIG. 13b. A guide wheel 177 is provided between the two link parts 174 and 175, which guide wheel can rotate about the pivot pin with the central axis 176. The guide wheel 177 is laterally retained between guide strips 178, which define the conveying path of the conveyor 171. The linear motor 172 energetically co-operates with the lower link part 175. The upper link part 174 is connected to an associated load-carrying platform 179. Also the links 173 are interconnected by a pivot pin, whose central axis 180 is shown in FIG. 13b. Also in the case of this pivot pin, a guide wheel 181 is provided.

The invention claimed is:

1. A device for conveying products along an endless conveying path, comprising:
   a frame;
   an elongated flexible conveying element supported by the frame, which includes links that are pivotable relative to each other about vertical pivots, each link including two sublinks, which sublinks are pivotable with respect to each other about a horizontal pivot; and
   load-carrying platforms each having a supporting surface at an upper side, which supporting surfaces jointly form a substantially closed, common supporting surface for the products, which load-carrying platforms are connected to the conveying element via supports and the supporting surfaces adjoin each other at curved forward and rearward edges thereof, and drive means for driving the conveying element, the drive means including a driving element and the conveying element including an element driven by the driving element, wherein the driven element forms part of the links of the conveying element.

2. The device according to claim 1, wherein the driven element includes a friction surface for driving the conveying element through frictional contact between the drive means and the friction surface.

3. A device according to claim 1, wherein the driving element includes a linear motor and the driven element comprises a reaction member for cooperation with the linear motor.

4. A device according to claim 3, wherein the linear motor extends on two opposite sides of the links.

5. A device according to claim 4, wherein the links are provided with at least one recess at a location of the linear motor.

6. A device according to claim 3, wherein the linear motor extends on a bottom side of the links.

7. A device according to claim 1, wherein each load-carrying platform includes two platform parts, which are pivotable with respect to each other about a horizontal pivot.

8. A device according to claim 1, wherein the horizontal pivot associated with two platform parts extends at least substantially straight above a horizontal pivot associated with two sublinks.

9. A device according to claim 1, wherein adjacent load-carrying platforms overlap under associated supporting surfaces at the curved forward edges and the curved rearward edges.

10. A device according to claim 1, wherein at least one longitudinal side of the common supporting surface is free from any screening thereabove over at least part of a length of the common supporting surface.

11. A device for conveying products along an endless conveying path, comprising:
a frame;
an elongated flexible conveying element supported by the frame, which includes links that are pivotable relative to each other about vertical pivots, adjacent links being interconnected via a fixable pin member that is pivotable between two pivoted positions, with respect to which pin member the links can pivot, the pin member including a first pin member part having a first vertical central axis for pivoting movement of a first of the adjacent links about the first pin member part, and a second pin member part having a second vertical central axis for pivoting movement of a second of the adjacent links about the second pin member part, which first and second central axes are spaced a distance apart; and
load-carrying platforms each having a supporting surface at an upper side, which supporting surfaces jointly form a substantially closed, common supporting surface for the products, which load-carrying platforms are connected to the conveying element via supports and the supporting surfaces adjoin each other at curved forward and rearward edges thereof, and drive means for driving the conveying element, the drive means including a driving element and the conveying element including an element driven by the driving element, wherein the driven element forms part of the links of the conveying element.

12. A device for conveying products along an endless conveying path, comprising:
a frame;
an elongated flexible conveying element supported by the frame, which includes links that are pivotable relative to each other about vertical pivots; and
load-carrying platforms each having a supporting surface at an upper side, a length of at least one supporting surface being different from lengths of other supporting surfaces, which supporting surfaces jointly form a substantially closed, common supporting surface for the products, which load-carrying platforms are connected to the conveying element via supports and the supporting surfaces adjoin each other at curved forward and rearward edges thereof, and drive means for driving the conveying element, the drive means including a driving element and the conveying element including an element driven by the driving element, wherein the driven element forms part of the links of the conveying element.

13. A device for conveying products along an endless conveying path, comprising:
a frame;
an elongated flexible conveying element supported by the frame, which includes links that are pivotable relative to each other about vertical pivots; and
load-carrying platforms each having a supporting surface at an upper side, which supporting surfaces jointly form a substantially closed, common supporting surface for the products, which load-carrying platforms are connected to the conveying element via supports and the supporting surfaces adjoin each other at curved forward and rearward edges thereof, and drive means for driving the conveying element, the drive means including a driving element and the conveying element including an element driven by the driving element, at least one load-carrying platform including first adjusting means for adjusting the length of the associated supporting surface, wherein the driven element forms part of the links of the conveying element.

14. A device for conveying products along an endless conveying path, comprising:
a frame;
an elongated flexible conveying element supported by the frame, which includes links that are pivotable relative to each other about vertical pivots, a length of at least one link being different from a length of other links; and
load-carrying platforms each having a supporting surface at an upper side, which supporting surfaces jointly form a substantially closed, common supporting surface for the products, which load-carrying platforms are connected to the conveying element via supports and the supporting surfaces adjoin each other at curved forward and rearward edges thereof, and drive means for driving the conveying element, the drive means including a driving element and the conveying element including an element driven by the driving element, wherein the driven element forms part of the links of the conveying element.

15. A device for conveying products along an endless conveying path, comprising:
a frame;
an elongated flexible conveying element supported by the frame, which includes links that are pivotable relative to each other about vertical pivots, at least one link including adjusting means for adjusting a length of the at least one link; and
load-carrying platforms each having a supporting surface at an upper side, which supporting surfaces jointly form a substantially closed, common supporting surface for the products, which load-carrying platforms are connected to the conveying element via supports and the supporting surfaces adjoin each other at curved forward and rearward edges thereof, and drive means for driving the conveying element, the drive means including a driving element and the conveying element including an element driven by the driving element, wherein the driven element forms part of the links of the conveying element.

16. A device for conveying products along an endless conveying path, comprising:
a frame;
an elongated flexible conveying element supported by the frame, which includes links that are pivotable relative to each other about vertical pivots; and
load-carrying platforms each having a supporting surface at an upper side, a proportion between length and width of the supporting surfaces being maximally 0.4, which supporting surfaces jointly form a substantially closed, common supporting surface for the products, which load-carrying platforms are connected to the conveying element via supports and the supporting surfaces adjoin each other at curved forward and rearward edges thereof, and drive means for driving the conveying element, the drive means including a driving element and the conveying element including an element driven by the driving element, wherein the driven element forms part of the links of the conveying element.

17. A device for conveying products along an endless conveying path, comprising:
a frame;
an elongated flexible conveying element supported by the frame, which includes links that are pivotable relative to each other about vertical pivots;
load-carrying platforms each having a supporting surface at an upper side, which supporting surfaces jointly form a substantially closed, common supporting surface for the products, which load-carrying platforms are connected to the conveying element via supports and the supporting surfaces adjoin each other at curved forward and rearward edges thereof, and drive means for driving the conveying element, the drive means including a driving element and the conveying element including an element driven by the driving element, wherein the driven element forms part of the links of the conveying element; and
a screening edge having a width of maximally 5.0 cm provided above at least one longitudinal side of the common supporting surface over at least part of a length of the common supporting surface.

18. A device according to claim 17, wherein the at least one longitudinal side is located on an outer side of the endless conveying path.

19. A device for conveying products along an endless conveying path, comprising:
a frame
an elongated flexible conveying element supported by the frame, which includes links that are pivotable relative to each other about vertical pivots;
load-carrying platforms each having a supporting surface at an upper side, which supporting surfaces jointly form a substantially closed, common supporting surface for the products, which load-carrying platforms are connected to the conveying element via supports and the supporting surfaces adjoin each other at curved forward and rearward edges thereof, and drive means for driving the conveying element, the drive means including a driving element and the conveying element including an element driven by the driving element, wherein the driven element forms part of the links of the conveying element; and
a screening edge positioned under at least one longitudinal side of the common supporting surface at a distance of maximally 1.0 cm from the load-carrying platforms, over at least part of a length of the common supporting surface.

20. A device for conveying products along an endless conveying path, comprising:
a frame;
an elongated flexible conveying element supported by the frame, which includes links that are pivotable relative to each other about vertical pivots; and
load-carrying platforms each having a supporting surface at an upper side, which supporting surfaces jointly form a substantially closed, common supporting surface for the products, which load-carrying platforms are connected to the conveying element via crossbeams and the supporting surfaces adjoin each other at curved forward and rearward edges thereof, each load-carrying platform being supported by at least three crossbeams, and drive means for driving the conveying element, the drive means including a driving element and the conveying element including an element driven by the driving element, wherein the driven element forms part of the links of the conveying element.

21. A device according to claim 20, wherein each crossbeam supports at least three load-carrying platforms and is rigidly connected to one of the at least three load-carrying platforms.

* * * * *